July 17, 1923.
C. DRIVER
BREAD PAN
Filed Feb. 7, 1922
1,461,974
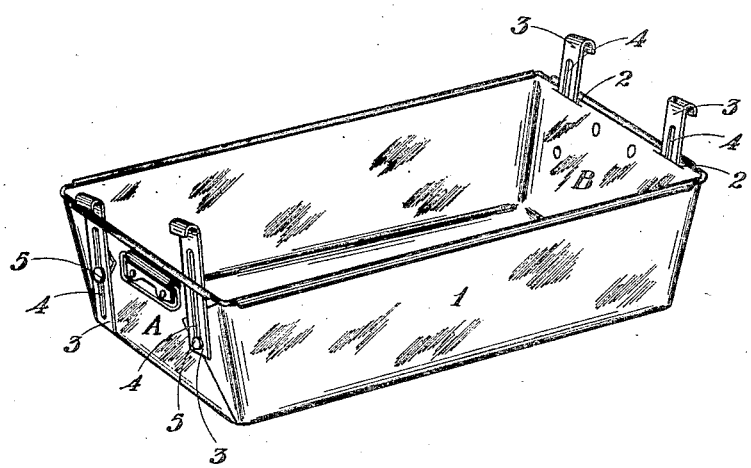
INVENTOR
*Clara Driver.*
BY *E. H. Bond*
ATTORNEY Patented July 17, 1923.

1,461,974

UNITED STATES PATENT OFFICE.

CLARA DRIVER, OF THESSALON, ONTARIO, CANADA.

BREAD PAN.

Application filed February 7, 1922. Serial No. 534,828.

*To all whom it may concern:*

Be it known that I, CLARA DRIVER, a citizen of the Dominion of Canada, residing at Thessalon, in the district of Algoma and Province of Ontario, have invented certain new and useful Improvements in Bread Pans, of which the following is a specification.

The present invention relates to bread pan construction. The object of my invention is to provide a bread pan having members adjustably positioned at the ends thereof for the purpose of preventing bread from rising over the ends of the pan.

This object I accomplish by means of such structure and relative arrangement of parts as will be hereinafter fully described and illustrated in the accompanying drawing which shows a perspective view of a bread pan constructed in accordance with my present invention.

The numeral 1 indicates a bread pan of conventional construction having extending through incisions 2 in the ends thereof, the adjustable members 3, having disposed therein elongated openings 4 for engagement with the studs 5. In operation, when it is desired to prevent the bread from rising over the ends of the pan, the members are elevated as shown at the end B of the pan 1 and when in this position, it will be readily discerned that the adjustable members will prevent the bread from rising over the ends of the pan.

What I claim as new is:

1. A bread pan having imperforate ends, and strips slidable through said ends with their lower portions on the outside of the pan and their upper portions disposed inside the pan to extend above the upper edge thereof to prevent the bread from rising over the ends of the pan.

2. The combination of a pan having end walls rolled outwardly at their upper ends, said outwardly rolled portions being provided with slots, studs in said end walls, strips provided with elongated slots to receive said studs, said strips being adjustably positioned in the slots in the end walls.

In testimony whereof, I hereunto affix my signature in the presence of two witnesses.

MRS. CLARA DRIVER.

Witnesses:
RUBY MCKENZIE,
MRS. CHARLES POTTER.